United States Patent
Sample et al.

(10) Patent No.: US 10,707,685 B2
(45) Date of Patent: Jul. 7, 2020

(54) RESONANT CAVITY MODE ENABLED WIRELESS POWER TRANSFER

(71) Applicant: Disney Enterprises, Inc., Burbank, CA (US)

(72) Inventors: Alanson P. Sample, Pittsburgh, PA (US); Matthew J. Chabalko, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 653 days.

(21) Appl. No.: 14/698,331

(22) Filed: Apr. 28, 2015

(65) Prior Publication Data

US 2016/0164301 A1    Jun. 9, 2016

Related U.S. Application Data

(60) Provisional application No. 62/088,983, filed on Dec. 8, 2014.

(51) Int. Cl.
| | | |
|---|---|---|
| *H01F 27/42* | (2006.01) | |
| *H01F 37/00* | (2006.01) | |
| *H01F 38/00* | (2006.01) | |
| *H02J 50/12* | (2016.01) | |
| *H02J 5/00* | (2016.01) | |
| *H02J 7/02* | (2016.01) | |
| *H02J 50/20* | (2016.01) | |
| *H02J 50/90* | (2016.01) | |

(52) U.S. Cl.
CPC .............. *H02J 5/005* (2013.01); *H02J 7/025* (2013.01); *H02J 50/12* (2016.02); *H02J 50/20* (2016.02); *H02J 50/90* (2016.02)

(58) Field of Classification Search
USPC .................................................. 307/104, 149
See application file for complete search history.

(56) References Cited

U.S. PATENT DOCUMENTS

| 8,180,286 B2 * | 5/2012 | Yamasuge ............ H04B 5/0037 |
| | | 307/104 |
| 8,299,652 B2 * | 10/2012 | Sample ................ H04B 5/0081 |
| | | 307/104 |
| 8,772,960 B2 * | 7/2014 | Yoshida ................ B60L 11/182 |
| | | 307/104 |

(Continued)

FOREIGN PATENT DOCUMENTS

| EP | 2736206 A1 | 5/2014 |
| EP | 2808972 A1 | 12/2014 |
| KR | 10-2011-0138678 | * 12/2011 ................ H02J 7/00 |

OTHER PUBLICATIONS

Rother, Stefan, Extended European Search Report for European Patent Application Serial No. 15195826, dated Apr. 25, 2016, 5 pages, Munich, Germany.

*Primary Examiner* — Adam D Houston
(74) *Attorney, Agent, or Firm* — Artegis Law Group, LLP (57) ABSTRACT

An embodiment provides a method of wireless power transmission, including: powering a transmitter that produces electromagnetic waves in a three dimensional structure; selecting a transmission frequency that is a resonance frequency for the three dimensional structure; and transmitting, using the transmitter, electromagnetic waves within the three dimensional structure on the transmission frequency selected. Other systems, methods, apparatuses and products are described and claimed.

25 Claims, 11 Drawing Sheets

(56) References Cited

U.S. PATENT DOCUMENTS

| | | | |
|---|---|---|---|
| 8,946,940 B2 * | 2/2015 | Kim | H02J 5/005 307/104 |
| 9,006,934 B2 * | 4/2015 | Kozakai | H03F 1/565 307/104 |
| 9,401,977 B1 * | 7/2016 | Gaw | H04W 52/0254 |
| 9,450,449 B1 * | 9/2016 | Leabman | H04B 5/0037 |
| 9,530,555 B2 * | 12/2016 | Teggatz | H01F 38/14 |
| 9,537,357 B2 * | 1/2017 | Leabman | H02J 50/15 |
| 9,559,553 B2 * | 1/2017 | Bae | H02J 50/12 |
| 9,571,974 B2 * | 2/2017 | Choi | H04W 4/023 |
| 9,620,996 B2 * | 4/2017 | Zeine | H02J 50/20 |
| 2003/0192053 A1 * | 10/2003 | Sheppard | H04H 20/63 725/81 |
| 2011/0133569 A1 | 6/2011 | Cheon et al. | |
| 2011/0184842 A1 * | 7/2011 | Melen | B60L 5/005 705/34 |
| 2012/0153894 A1 * | 6/2012 | Widmer | H04B 5/0037 320/108 |
| 2012/0280575 A1 * | 11/2012 | Kim | H02J 17/00 307/104 |
| 2013/0284859 A1 * | 10/2013 | Polivka | B61L 27/0055 246/34 R |
| 2013/0328417 A1 * | 12/2013 | Takeuchi | H02J 5/005 307/149 |
| 2014/0008992 A1 * | 1/2014 | Leabman | H01F 38/14 307/104 |
| 2014/0008993 A1 * | 1/2014 | Leabman | H02J 17/00 307/104 |
| 2014/0009108 A1 * | 1/2014 | Leabman | H02J 17/00 320/107 |
| 2014/0015329 A1 * | 1/2014 | Widmer | H02J 50/60 307/104 |
| 2014/0139034 A1 * | 5/2014 | Sankar | H02J 17/00 307/104 |
| 2014/0203657 A1 | 7/2014 | Song et al. | |
| 2014/0354221 A1 * | 12/2014 | Leabman | H01F 38/14 320/108 |
| 2014/0375253 A1 * | 12/2014 | Leabman | H02J 7/025 320/108 |
| 2015/0001949 A1 * | 1/2015 | Leabman | H02J 7/025 307/104 |
| 2015/0015192 A1 * | 1/2015 | Leabman | H02J 7/025 320/108 |
| 2015/0022009 A1 * | 1/2015 | Leabman | H02J 7/025 307/104 |
| 2015/0042264 A1 * | 2/2015 | Leabman | H02J 17/00 320/108 |
| 2015/0054355 A1 * | 2/2015 | Ben-Shalom | H02J 50/10 307/104 |
| 2015/0097663 A1 * | 4/2015 | Sloo | G01N 27/02 340/501 |
| 2015/0115733 A1 * | 4/2015 | Sealy | H02J 50/10 307/104 |
| 2015/0130285 A1 * | 5/2015 | Leabman | H01F 38/14 307/104 |
| 2015/0155738 A1 * | 6/2015 | Leabman | H02J 7/025 307/29 |
| 2015/0162751 A1 * | 6/2015 | Leabman | A41B 1/08 219/211 |
| 2015/0171656 A1 * | 6/2015 | Leabman | H02J 7/025 320/108 |
| 2015/0270741 A1 * | 9/2015 | Leabman | H02J 7/025 307/9.1 |
| 2015/0318729 A1 * | 11/2015 | Leabman | H02J 7/025 307/104 |
| 2015/0326068 A1 * | 11/2015 | Bell | H02J 17/00 307/149 |
| 2015/0326069 A1 * | 11/2015 | Petras | G05F 5/00 307/104 |
| 2015/0333528 A1 * | 11/2015 | Leabman | H04B 5/0037 307/104 |
| 2015/0333529 A1 * | 11/2015 | Leabman | H02J 50/40 307/104 |
| 2015/0333573 A1 * | 11/2015 | Leabman | H02J 5/005 307/104 |
| 2015/0340910 A1 * | 11/2015 | Petras | H02J 17/00 320/108 |
| 2016/0013656 A1 * | 1/2016 | Bell | H04B 1/3838 307/104 |
| 2016/0020639 A1 * | 1/2016 | Pudipeddi | H02J 7/0042 320/108 |
| 2016/0020649 A1 * | 1/2016 | Bell | H02J 17/00 307/104 |
| 2016/0099601 A1 * | 4/2016 | Leabman | H02J 50/40 307/104 |
| 2016/0099602 A1 * | 4/2016 | Leabman | H02J 7/025 307/104 |
| 2016/0099609 A1 * | 4/2016 | Leabman | H02J 50/40 307/104 |
| 2016/0099610 A1 * | 4/2016 | Leabman | H02J 17/00 307/104 |
| 2016/0099612 A1 * | 4/2016 | Leabman | H02J 50/40 307/104 |
| 2016/0099755 A1 * | 4/2016 | Leabman | H04B 5/0037 307/104 |
| 2016/0099756 A1 * | 4/2016 | Leabman | H04B 5/0037 307/104 |
| 2016/0099757 A1 * | 4/2016 | Leabman | H04B 5/0037 307/104 |
| 2016/0099758 A1 * | 4/2016 | Bell | H02J 7/0027 307/104 |
| 2016/0172869 A1 * | 6/2016 | Park | H02J 50/10 307/104 |
| 2016/0191121 A1 * | 6/2016 | Bell | H04B 5/0037 307/104 |
| 2016/0204622 A1 * | 7/2016 | Leabman | H04W 4/005 307/104 |
| 2017/0085437 A1 * | 3/2017 | Condeixa | H04L 43/06 |
| 2017/0092115 A1 * | 3/2017 | Sloo | G01N 27/02 |

* cited by examiner

RESONANT CAVITY MODE ENABLED WIRELESS POWER TRANSFER

CROSS-REFERENCE TO RELATED APPLICATIONS

This application claims priority to U.S. provisional application entitled, "Resonant Cavity Mode Enabled Wireless Power Transfer," having Ser. No. 62/088,983, filed Dec. 8, 2014, which is entirely incorporated by reference herein.

FIELD

The subject matter described herein generally relates to wireless power transfer.

BACKGROUND

Wireless power transfer (WPT) includes wireless techniques for charging of battery powered devices. This wireless charging operates using close proximity between the charging source and the device to be charged. For example, WPT technologies such as near-field manetoquasistatic (MQS) WPT and inductive charging are capable of charging a device (e.g., one or two devices) by bringing the device into close proximity with a charging source. This wireless charging technique commonly includes inducing a current in the device to be charged by placing it on or in close proximity with the power source. Common examples include charging an electric toothbrush in a charging stand, using a power transfer mat upon which a mobile device is laid, etc.

WPT also includes a power source providing a small amount of power for certain device devices at a distance. For example, broadcast far-field WPT is capable of transferring power at greater distances, e.g., to a radio frequency identification (RFID) tag. However, this broadcast technique is not efficient in that commonly less than 0.1% of the source power is provided to the target device. Moreover, regulations often (which vary by jurisdiction) limit the amount of power transferred using such techniques to approximately 100 uW. While point-to-point far-field WPT systems maintain higher end-to-end efficiency, these techniques require complex control and tracking mechanisms to maintain a line of sight connection between the power source and the target and are likewise limited in the amount of power that they can deliver.

BRIEF SUMMARY

In summary, an embodiment provides a method of wireless power transmission, comprising: powering a transmitter that produces electromagnetic waves in a three dimensional structure; selecting a transmission frequency that is a resonance frequency for the three dimensional structure; and transmitting, using the transmitter, electromagnetic waves within the three dimensional structure on the transmission frequency selected.

Another embodiment provides an apparatus for wireless power transmission, comprising: a power source; and a transmitter operatively coupled to the power source, the transmitter being placed in a three dimensional structure and producing electromagnetic waves; wherein the transmitter transmits at a transmission frequency that is a resonance frequency for the three dimensional structure.

A further embodiment provides a system for wireless power transmission, comprising: a three dimensional structure; a transmitter placed in the three dimensional structure; a power source that powers the transmitter to produce electromagnetic waves in the three dimensional structure; wherein the transmitter transmits at a transmission frequency that is a resonance frequency for the three dimensional structure.

Another embodiment provides an apparatus receiving wireless power, comprising: a processor; a memory storing instructions that are executable by the processor; and a receiver that is coupled to the processor; the receiver being tuned to receive wireless power transmitted at a resonance frequency for a three dimensional space.

For a better understanding of the embodiments, together with other and further features and advantages thereof, reference is made to the following description, taken in conjunction with the accompanying drawings. The scope of the invention will be pointed out in the appended claims

BRIEF DESCRIPTION OF THE DRAWINGS

FIG. 3(A-C) illustrates electromagnetic field distribution for example frequencies in an example three dimensional structure.

FIG. 5(A-B) illustrates example frequency selection and WPT for the example implementation of FIG. 4.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. The various embodiments can be practiced without one or more of the specific details, or with other methods, components, materials, et cetera. In other instances, well known structures, materials, or operations are not shown or described in detail to avoid obfuscation.

An embodiment provides a technique to wirelessly transmit power anywhere in a confined three dimensional space. In an embodiment, a transmitter is stimulated at a natural electromagnetic frequency for the space according to the three dimensional structure enclosing or defining the space. For example, for a metallic structure an embodiment produces low level electromagnetic fields at a resonance frequency for the metallic structure such that power or energy is transmitted efficiently to a coupled receiver placed within the space, i.e., placed with the metallic structure.

In an embodiment, methods are provided to ensure that wireless power is delivered to multiple devices inside the three dimensional structure. In an embodiment one or more division techniques are provided such that multiple receivers are powered within the three dimensional structure without taking away power transmission from one another. For example, in an embodiment the receivers in the structure that receive the transmitted power may employ a time division multiplexing scheme that allocates time slots where a receiver is tuned into the frequency or power channel of the transmission system. By way of example, the timing of such receiver tuning may be communicated by an out of band communication channel such as via short range wireless communication technologies including BLUETOOTH, WiFi, ZIGBEE, etc. The receiver is tuned to the resonant frequency power transmission via tuning the resonant frequency of the receiver (such as a coil or a dipole antenna), for example using a variable capacitor or variable inductor (or switch bank of capacitors or inductors). The receiver may also be tuned by using a relay or switch to connect and/or disconnect the coil to the receiver electronics. The receiver may also be tuned by controlling the input impedance of the receiver so that it is matched or mismatched to the receiver coil or antenna.

In an embodiment, frequency division multiplexing is used to provide a frequency division multiplexing scheme where power is transferred at different frequencies. The various receivers in turn are tuned to receive power at one or more of the frequencies used to transmit the wireless power. This allows the receiving devices to receive power on a particular transmission frequency.

In an embodiment, a technique is provided to increase the volume within the three dimensional space that is capable of transmitting wireless power using a resonant frequency of the structure. For example, for a given resonant frequency of a particular three dimensional structure or space, the resonant frequency will not fully cover all regions of the three dimensional structure with equal WPT efficiency or power. Therefore, an embodiment employs multiple resonant frequencies, either at the same time or at different times, in order to increase the volume of the three dimensional space that is covered. For example, an embodiment may transmit at two or more resonant frequencies using time and/or frequency domain multiplexing or simultaneous transmission via superposition to cover a larger volume of the three dimensional structure with usable wireless power transmission.

In an embodiment, a technique is provided to increase the degrees of freedom with respect to the receiver's orientation to the transmitter. For example, a given resonant frequency for a three dimensional space may power receivers oriented in a particular direction. In order to increase the available receiver orientations, an embodiment uses more than one transmitter such that variously oriented receivers may receive wireless power transmitted on one or more resonant frequencies.

In an embodiment, a receiver is formed as a coil type receiver. However, in some implementations a coil type receiver may not be desirable. Accordingly, an embodiment provides a receiver in the form of a dipole antenna (capacitive antenna) such that a larger range of devices may incorporate the receiver. In an embodiment, a coupling between the resonant transmission source and the receiving dipole antenna is provided, as is a technique for discovering the coupling there-between.

The illustrated example embodiments will be best understood by reference to the figures. The following description is intended only by way of example, and simply illustrates certain example embodiments.

Figure 1A:
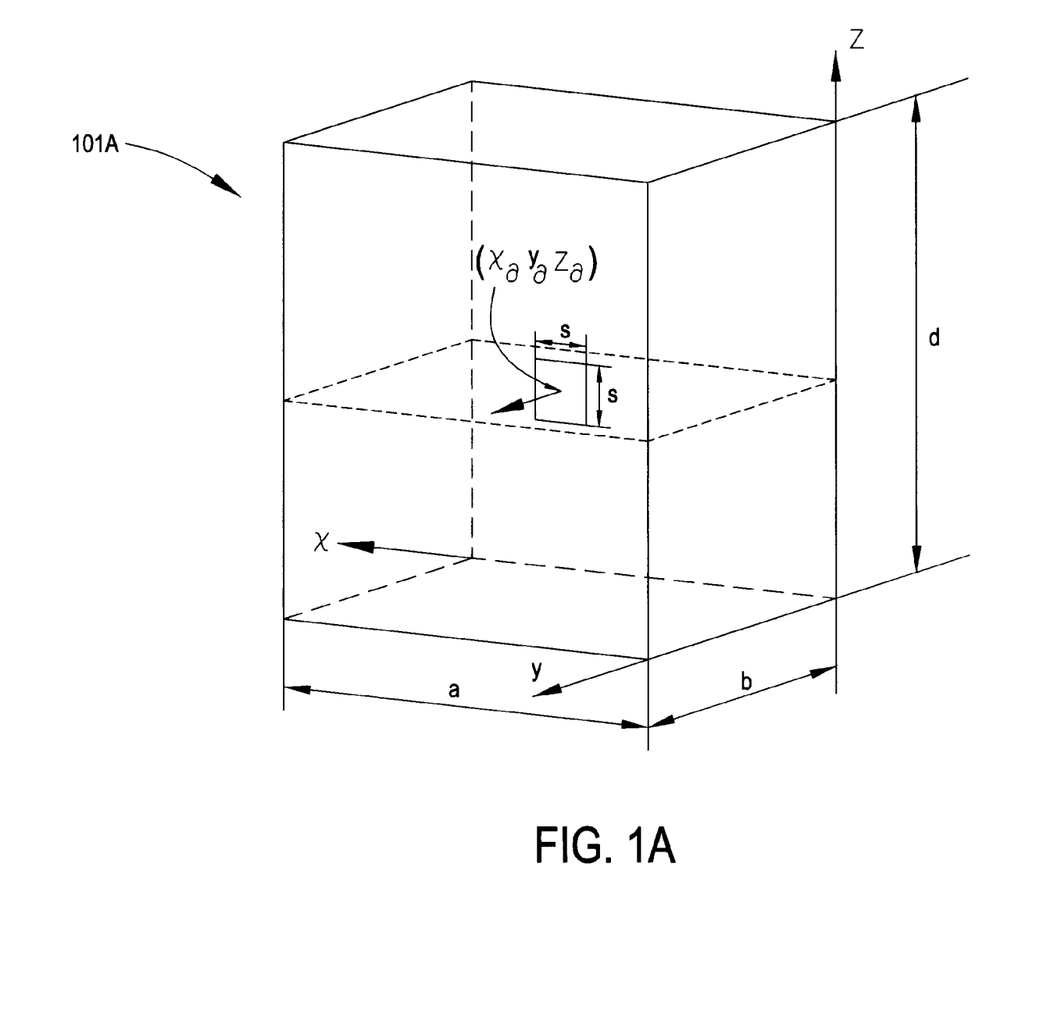
FIG. 1A illustrates an example three dimensional structure and receiver.
Figure 1B:
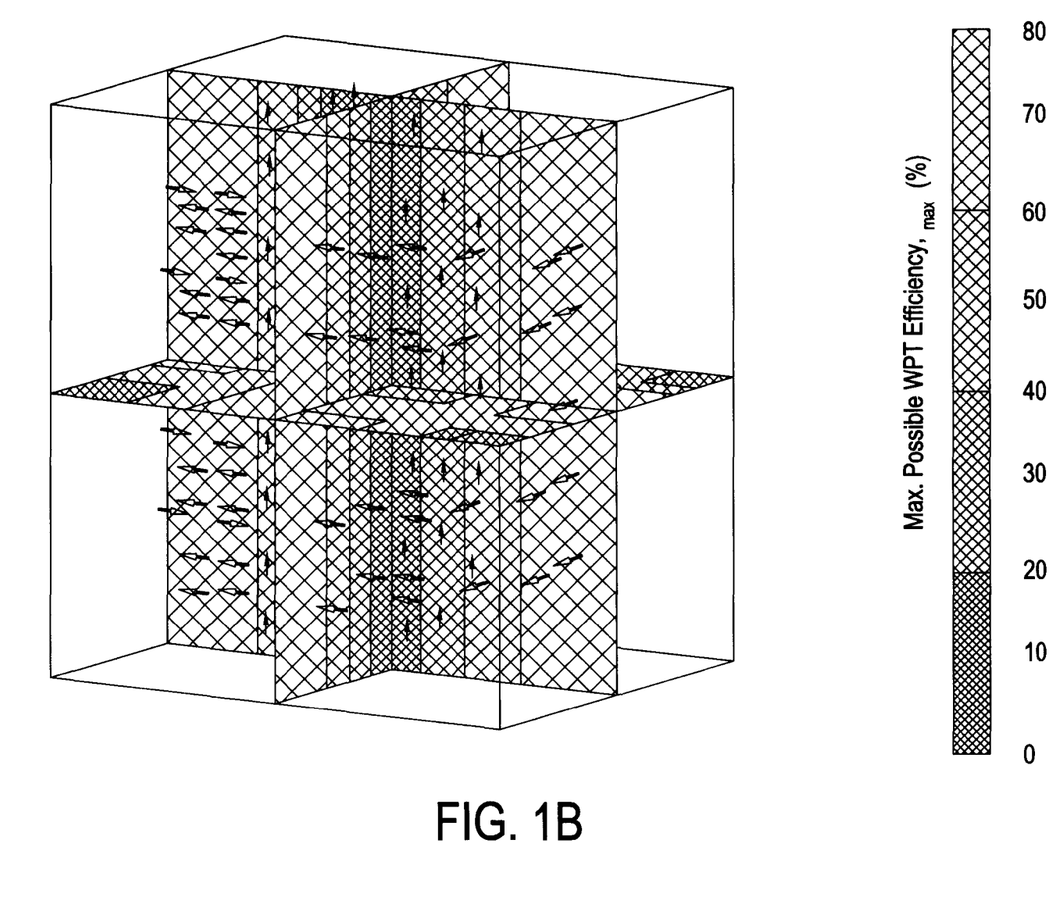
FIG. 1B illustrates electromagnetic field distribution for an example frequency in an example three dimensional structure.

Referring to FIG. 1(A-B), an example system for resonant cavity mode enabled wireless power transfer is illustrated. FIG. 1(A) illustrates a diagram of an example cavity resonator in the form of a rectangular box 101, although the technique is applicable to arbitrary shapes. In FIG. 1(A), the receiver 102 has a given length(s) and is located at a position of $x_0$, $y_0$, $z_0$. The horizontal and vertical dotted lines in FIG. 1(A) indicate a coil measurement plane and line, respectively.

Figure 2A:
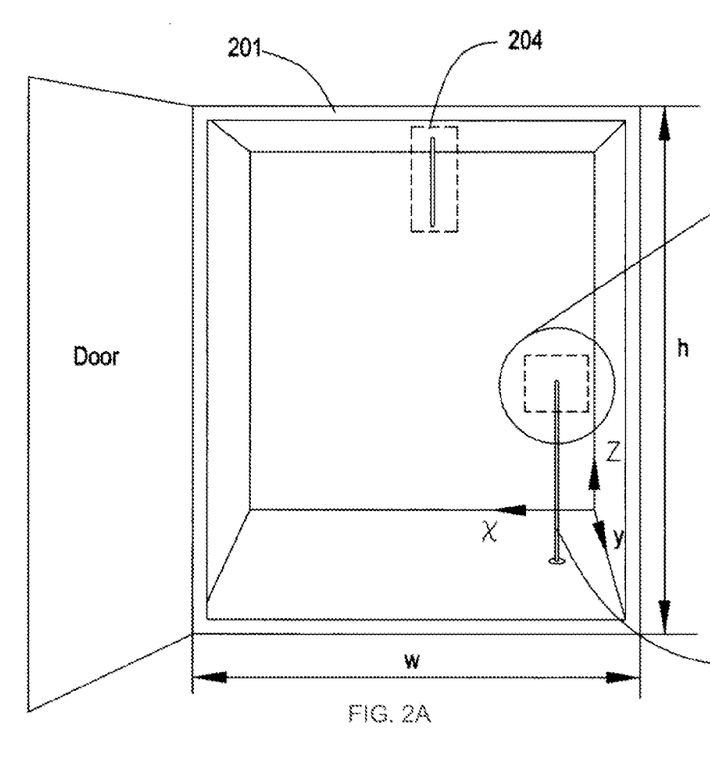
FIG. 2A illustrates an example three dimensional structure.
Figure 2B:
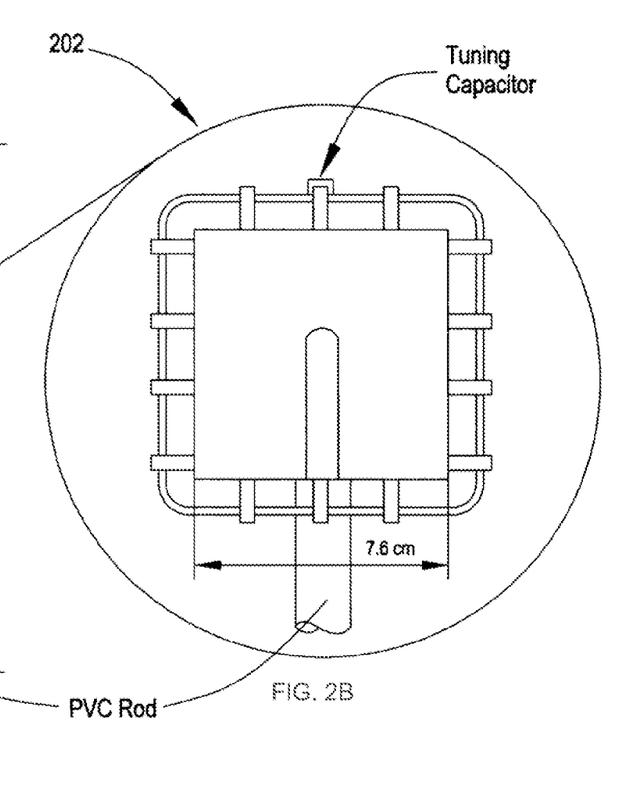
FIG. 2B illustrates an example receiver.

FIG. 1(B) illustrates an electromagnetic field distribution for an example resonant frequency emitted by a transmitter, as described more fully in FIG. 2. The field distribution is keyed to a relative magnitude of the field in three parts, i.e., large, small and intermittent. The arrows represent the field vectors.

As shown in FIG. 1(B), a given resonant frequency for a given cavity space has a characteristic electromagnetic field that transfers power to a receiver. Depending on the location of the receiver, differing amounts of power are transmitted wirelessly.

Parameters for maximizing or increasing the efficiency of the WPT between two resonators (here, the transmitter and the receiver) include the coupling coefficient between the resonators and the quality factors (Q-factors) of each resonator (transmitter and receiver). Coupling mode theory (CMT) is used to derive an analytical expression for the coupling coefficient between a cavity resonator and a small receiver, as further described in U.S. Provisional Patent Application Ser. No. 62/088,983. CMT is used to posit the coupling of generic, lossless resonators and this may in turn be extended to specific coupling between the example rectangular cavity resonator and the example small coil receiver.

By knowing the Q-factors and resonant frequencies of the chamber and the receiver coil, along with the coupling coefficient between the two, it is possible to predict the WPT efficiency at any point in the cavity space.

FIG. 2(A-B) illustrates an example operating system for resonant wireless power transfer. A rectangular aluminum cavity 201 and square coil receiver 202 act as the resonators. In FIG. 2(A) the cavity dimensions are a=1.52 m, b=1.42 m and c=1.83 m. A hinged door 203 is included. Copper tape may be used on the door jams, although this is not required.

A 25 cm linear probe (transmitter) 204 is attached to the center of the ceiling panel to excite a resonant mode. The receiver 202 includes a mall, single turn, square coil that is 7.62 cm on each side. The receiver 202 is, for example, made of copper wire and is illustrated affixed to an acrylic frame. The coil of the receiver 202 terminates in a variable capacitor, which is tuned to the same resonant frequency as the mode of the chamber 201 (stimulated using transmitter 204).

In order to determine the Q-factors and resonant frequencies of the receiver 202 and chamber 201, a Vector Network Analyzer (VNA) is used to record measurements of each component. Then, standard microwave resonator measurement techniques are used to extract system parameters. In the case of the example chamber of FIG. 2(A-B), a VNA was used to stimulate a resonant mode of the linear probe 204. For example, an extracted resonant frequency of the resonant chamber is 143.09 Mz. A resonant frequency may be predicted and confirmed via measurement. In this case, Finite Element Method (FEM) using commercial COMSOL Multiphysics software simulated a frequency of 144.15 Mz for the example chamber 201 of FIG. 2(A-B). The average extracted Q-factor for this example chamber 201 is 980.

Similarly, measurements may be conducted to determine the parameters of the receiver coil 202. In this example, a 2.45 cm diameter coil (miniloop transformer) inductively couples into the receiver 202 so that a non-contact measurement can be made with a VNA. The capacitor on the coil of the receiver 202 is provided such that its resonant frequency is that of the chamber (143.09 Mz).

Because the coupling coefficient is a parameter of interest in predicting WPT efficiency, an example of measurement based determination of the couple coefficient is described. Two coupled resonators (here chamber/transmitter (201/204) and receiver 202) have resonant symmetric and anti-symmetric modes that occur at two different frequencies, and this difference in these frequencies has a determined relationship. Thus, by measuring the resonant frequencies of the modes of a full system (here chamber/transmitter (201/204) and receiver 202) using a VNA, the coupling coefficient may be determined. By way of example, the receiver 202 was placed in the chamber on a stand (e.g., PVC stand) at a height (z) of 76 cm and moved to positions along a 11×10, x-y grid (represented by horizontal plane in dashed line in FIG. 1(A)). At each location, a measurement was taken with the VNA via the linear probe 204 (with the door of the chamber 201 closed). Using the previously measured values for the Q-factor of the chamber 201 and receiver 202, the intrinsic loss rates of the chamber 201 and receiver 202 may be evaluated. Using the measured magnitude of the difference of the resonant symmetric and anti-symmetric modes, the coupling coefficient may be determined given an equation representing the coupled resonators' amplitude evolution over time.

As has been described, different system characteristics (e.g., structure/cavity shape) impact the volume and/or location within the structure where WPT is maximal. In the example system described in FIG. 2(A-B) the peak WPT efficiency at any point within the space is about 72%, with many areas experiencing over 60% efficiency.

The WPT provided by such resonance transmission has constant efficiency as a function of distance. For example, when the receiver 202 is moved along the z-axis (illustrated in FIG. 2(A)) with $x_0$, $y_0$=65.5 cm, as depicted in the vertical dashed line in FIG. 1A, the measured efficiency remains within 5%-10% of the maximum expected power transmission. Of this, 5%-6% of the loss is due to imperfect impedance match.

A single resonant mode may provide WPT over more than one dimension (e.g., x and y). However, for a given resonant mode, certain dimension (e.g., z) will not experience wireless power transfer. Accordingly, in an embodiment, more than one resonant mode may be used to provide WPT and/or more than one transmitter 204 may be deployed within the space. This provides greater coverage of the space in terms of WPT efficiency and imparts flexibility to the system in terms of orientation of the receiver(s) and the amount of space that is usable for WPT.

Additionally, some receiver orientations will experience magnetic flux and a coupling coefficient that varies spatially, even with multiple modes. Therefore, in practice wireless power systems using resonant WPT may adjust the receiver to adapt the receiver's impedance and resonant frequency. Moreover, in some situations the receivers may employ time division multiplexing, e.g., by de-tuning their matching network so that peak power can be provided to individual devices or groups thereof (e.g., those in most need of WPT, as communicated for example by another communication channel).

Since there is no one mode that provides a field having the same magnitude and direction for WPT that is everywhere in the cavity space, more than one mode may be used to achieve a combined magnetic field that covers a large volume of the cavity. By choosing more than one mode, a three dimensional area of the cavity volume that experiences low WPT efficiency at one mode may be complimented by choosing another mode at which the same three dimensional area has a higher WPT efficiency.

Figure 3A:
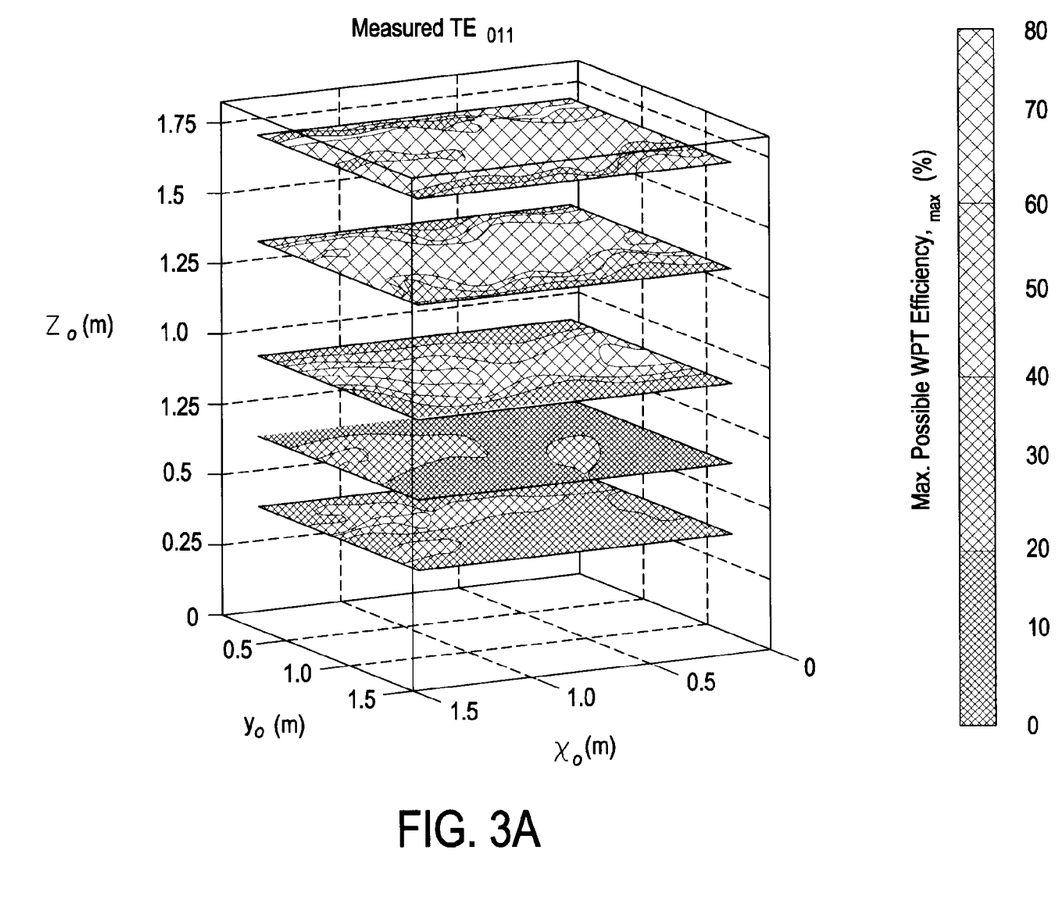
Figure 3B:
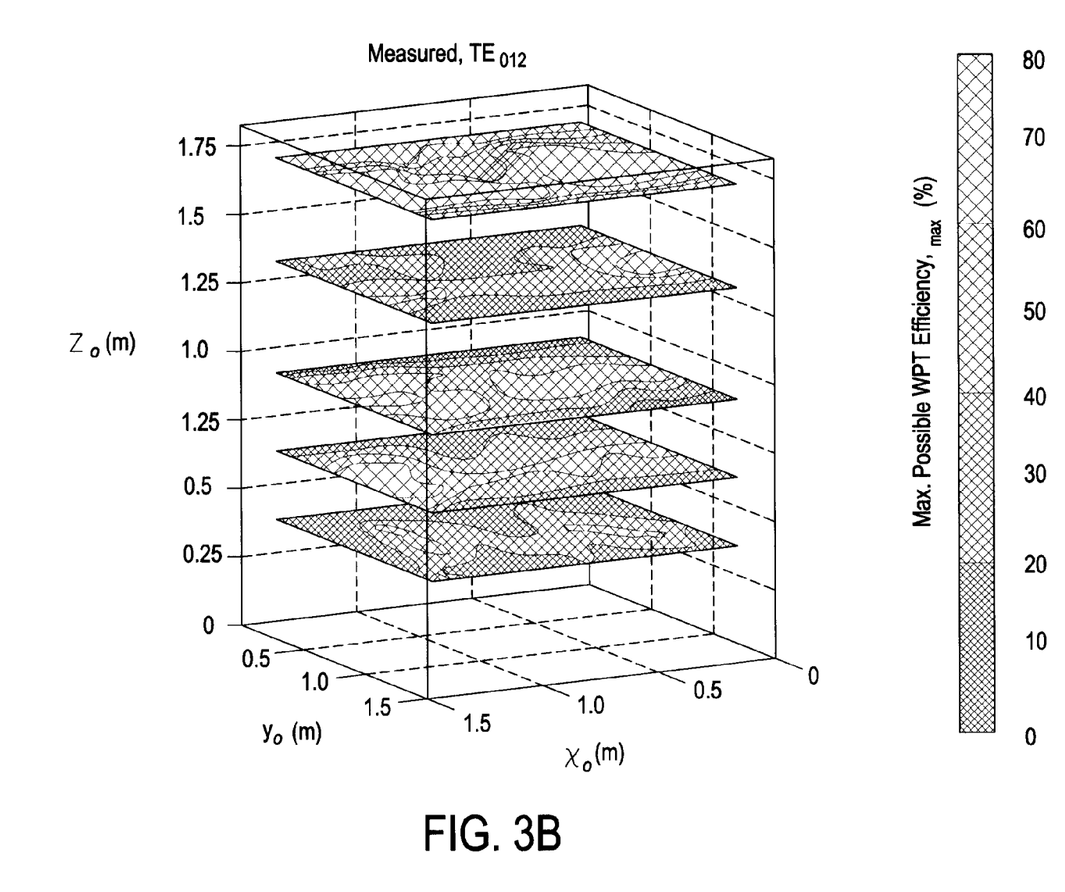
Figure 3C:
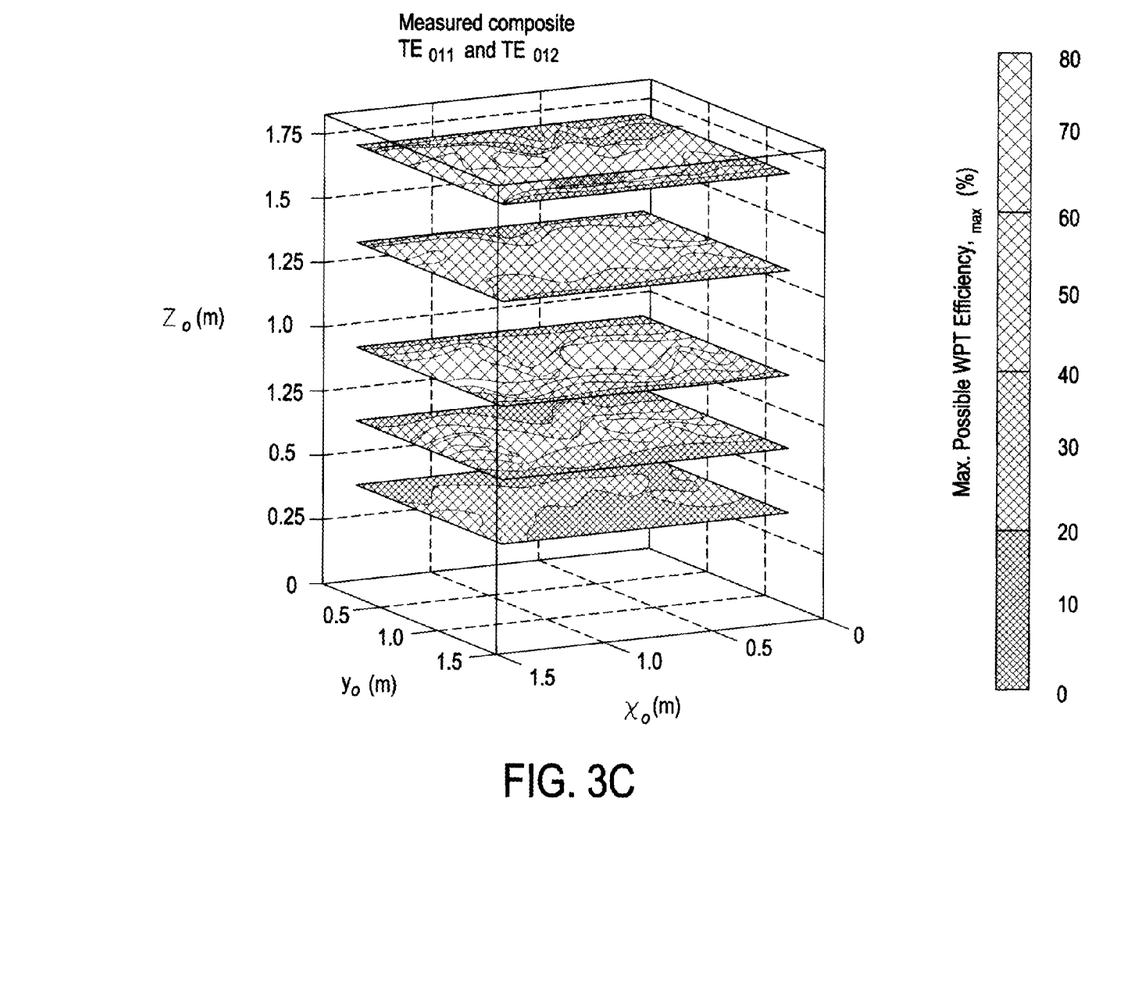

By way of example, FIG. 3(A-C) illustrates measured WPT efficiency for a coil receiver (similar to receiver 202) in a resonance cavity (similar to chamber 201). As illustrated, in a first mode (with a frequency of 132.76 Mz, termed $TE_{011}$), a coil receiver experiences maximal magnetic flux and thus highest WPT efficiency at an upper region of the chamber, as illustrated in FIG. 3A. In contrast, as second mode (with a frequency of 193.93 Mz, termed $TE_{012}$), the same coil receiver experiences highest WPT efficiency in a middle region of the chamber, as illustrated in FIG. 3B. Therefore, as shown in FIG. 3C, the modes may be used in combination to boost the coverage area of three dimensional space that experiences high efficiency WPT. Given the uniformity of the magnetic flux density over certain regions of the chamber for a given resonance mode, not only may one device be powered over large volumes of the chamber space, but many devices may be powered simultaneously.

When a receiver moves about the chamber, it continues to receive WPT in various areas. The efficiency of WPT may vary spatially. However, a receiver that is tuned a single time continues to receive WPT at efficiency in excess of 50% throughout much of the chamber. The receiver may be dynamically re-tuned in order to increase the WPT efficiency towards the maximum WPT efficiency.

Figure 4:
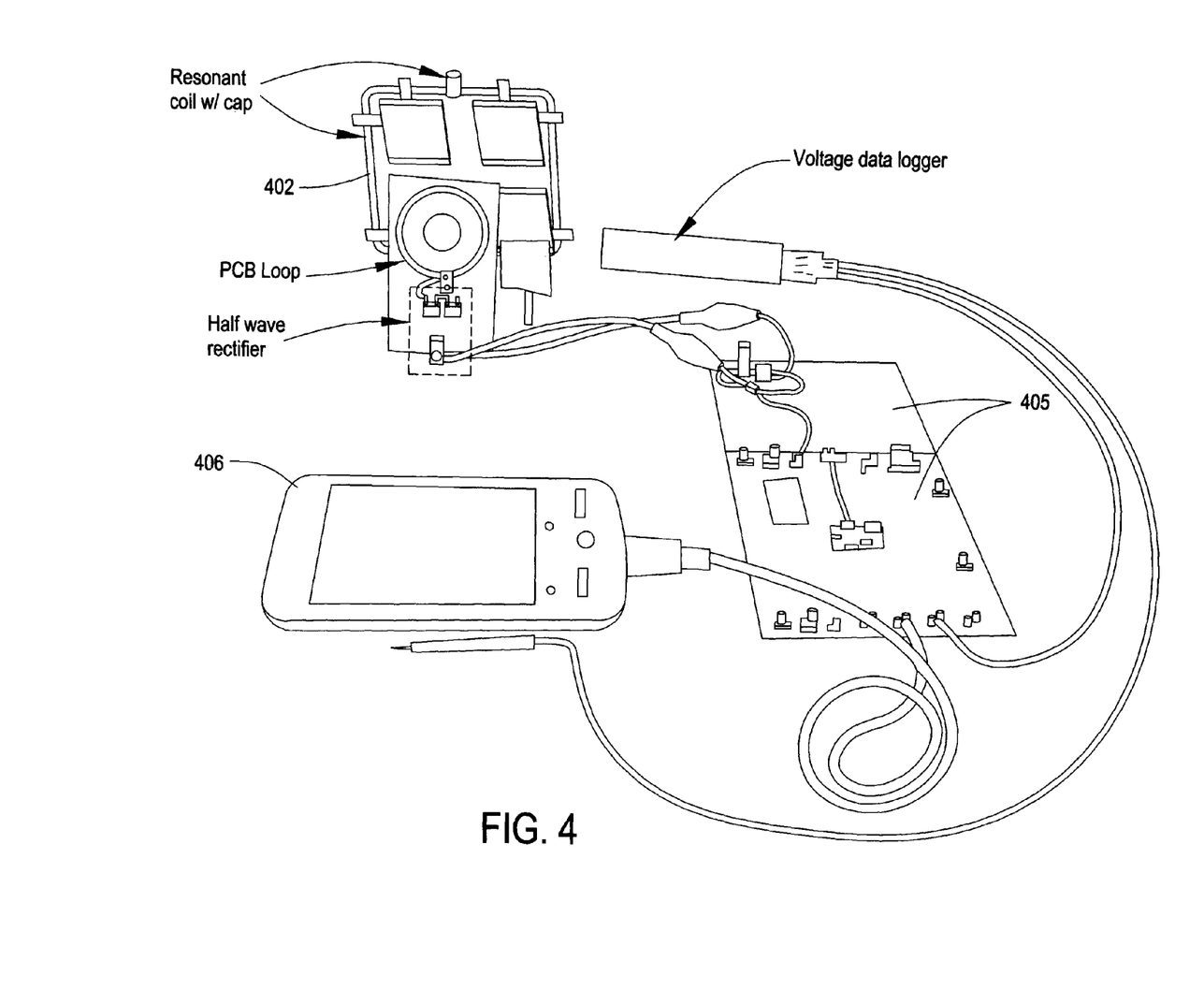
FIG. 4 illustrates an example implementation with a cellular phone.

FIG. 4 illustrates an example implementation where a receiver 402 is coupled to a half wave rectifier via a PCB loop and thereafter to a power management board 405, which is in turn coupled to a rechargeable batter of a cellular phone 406. Approximately 1 W of power was driven into the chamber by the transmitter. A voltage data logger may be used to monitor the output voltage of the receiver 402 circuit attached to the cellular phone 406.

Figure 5A:
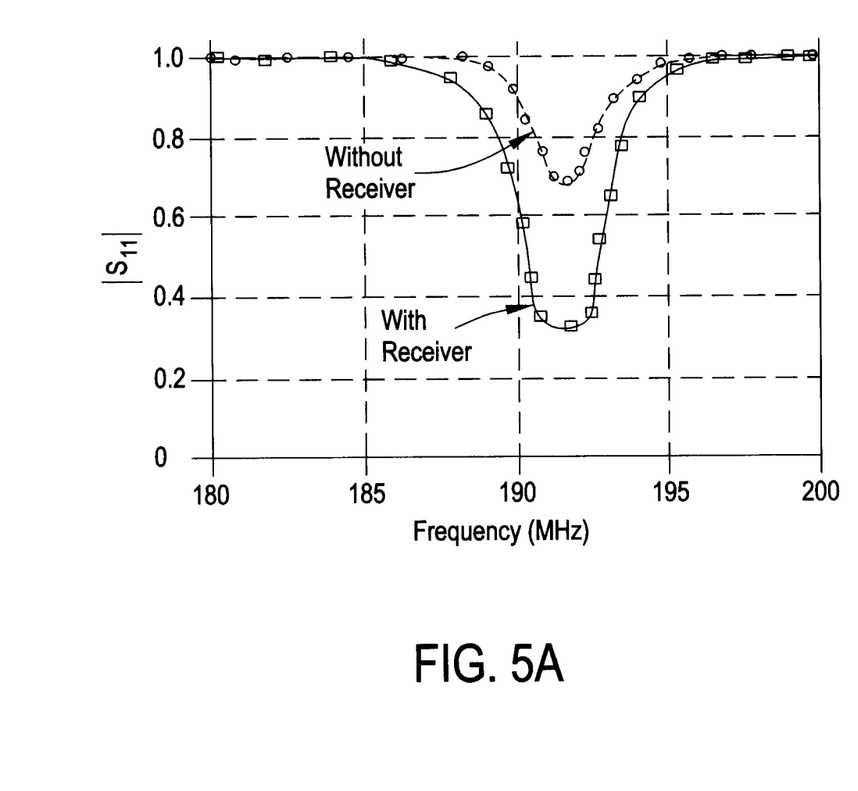
Figure 5B:
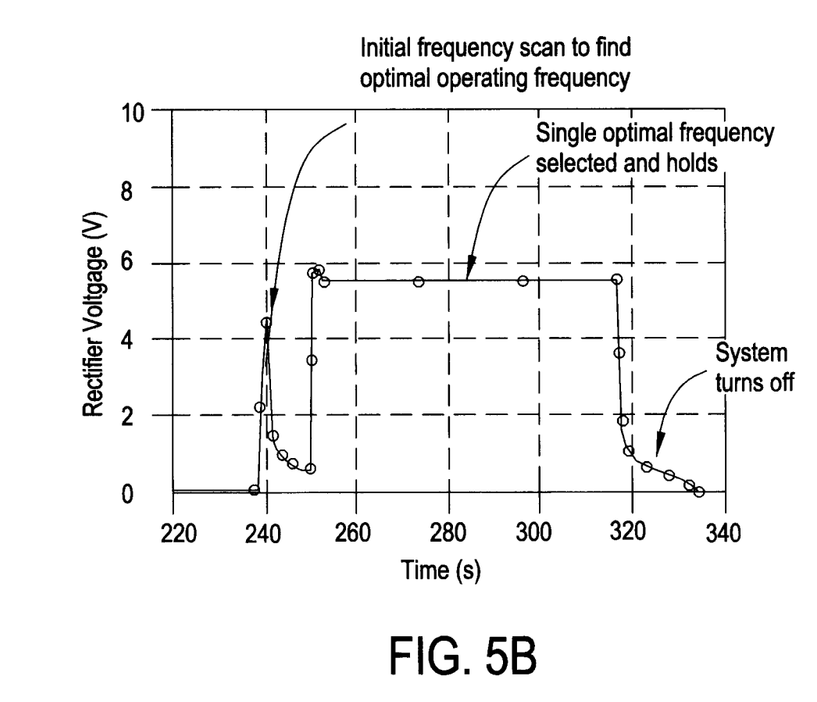

FIG. 5(A-B) illustrates an example of choosing a resonant frequency and the resultant output at the frequency chosen for the example implementation of FIG. 4. In FIG. 5(A), $|S_{11}|$ measurements undergo a pronounced decrease in the minimum at a frequency between 190 Mz and 195 Mz when the receiver is placed within the chamber. Thus, these measurements illustrate that the receiver is receiving WPT using this frequency.

FIG. 5B illustrates voltage outputs for the example implementation of FIG. 4. As shown in FIG. 5B, a frequency scan across the frequencies of FIG. 5(A) results in an initial spike and, once a single frequency (e.g., an optimal frequency as referenced in FIG. 5(A)) is chosen, the rectifier voltage received is approximately 6V over the time duration at that transmission frequency. This voltage is in turn fed to the rechargeable battery of the cellular phone 406 for charging.

Although a coil (single loop) receiver was used in the example implementation of FIG. 4, a small dipole antenna may be used. For example, a similar analytic expression for predicting a coupling coefficient for a sub-wavelength dipole (i.e., 3.81 cm, 5.08 cm, and 7.62 cm) in a resonance chamber (i.e., a chamber such as the rectangular, metallic box described herein) was developed. This, along with the Q-factors, similarly allows for predicting WPT efficiency for the small dipole within various locations of the chamber at a given resonance frequency. Again, it can be demonstrated that for many areas in the chamber, WPT efficiency exceeds 60% for a small dipole, similar to a coil receiver.

Figure 6:
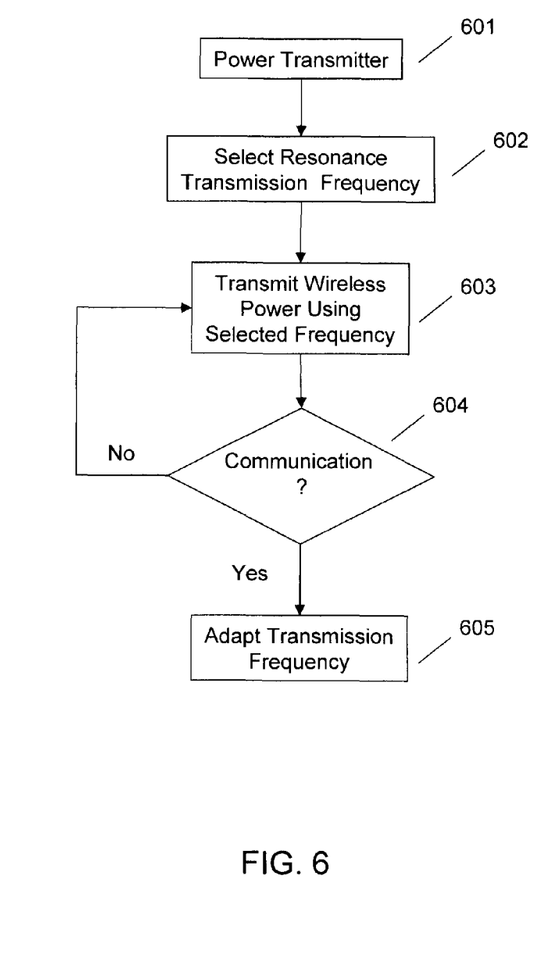
FIG. 6 illustrates an example WPT transmission method.

Referring now to FIG. 6, an embodiment then provides a method of wireless power transmission where a transmitter, e.g., transmitter 204, produces electromagnetic waves in a three dimensional structure, e.g., a rectangular metallic structure, under power of a power source. Thus, power source powers transmitter at 601 in order to produce electromagnetic waves to be transmitted within the three dimensional structure.

A frequency scan may be used, which may in turn be aided by analysis of predicted WPT efficiency to select a transmission frequency that is a resonance frequency for the three dimensional structure at 602. This permits the transmitter to transmit electromagnetic waves within the three dimensional structure on the transmission frequency selected at 603. The transmission on the resonance frequency may be used by any receiver(s) in the three dimensional structure, e.g., to provide charging to coupled devices such as cell phones, power tools, toys, or any like electronic device.

Selecting at 602 may include selecting two or more transmission frequencies that are resonance frequencies for the three dimensional structure. For example, the two or more frequencies may be transmitted at different times to provide a greater volume of resonant wave transmission to the three dimensional structure. This selecting may be done using communication between the receiving devices and the transmission devices.

It is worth noting that while the metallic rectangular box has been used as an example three dimensional structure, other shapes or materials may be used so long as these are amendable to creation of a resonance wave therein. Moreover, while the three dimensional structure may be substantially or completely enclosed, the three dimensional structure may also be discontinuous, e.g., including one or more openings such as windows, etc. It is possible, for example, to establish a suitable resonance structure from many different physical structures, including boxes, partial enclosures, portions of buildings, etc.

The volume of the three dimensional structure that is covered with high efficiency WPT waves may be increased by transmitting with more than one transmitter and/or at various frequencies. For example, the powering at 601 may include powering two or more transmitters, and the transmitting at 602 may include transmitting with the two or more transmitters, where the two or more transmitters are placed at different locations within the three dimensional structure. In addition, the two or more transmitters may each transmit on a unique resonance frequency.

If the receiver device(s) and the transmission system engage in communication, either unidirectional or bidirectional, an embodiment may adjust the transmission system and/or the receiver(s). For example, at 604 the transmission system may communicate to one or more of the receivers to instruct them to tune in to a particular frequency or de-tune in order to adjust WPT within the system. Likewise, one or more of the receivers may communicate at 604 to the transmission system, e.g., to indicate that they are fully charged, such that another frequency of transmission may be selected, as illustrated by way of example at 605.

Figure 7:
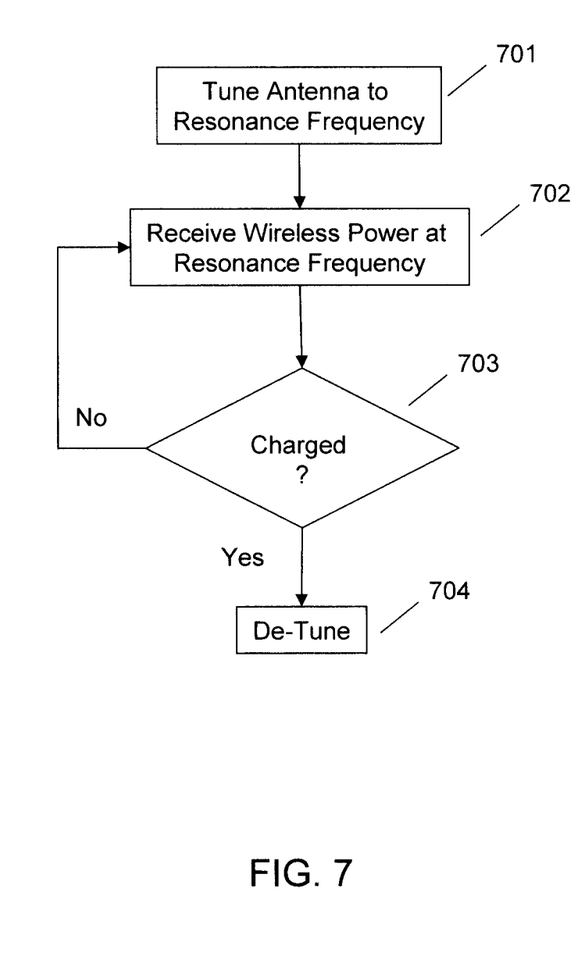
FIG. 7 illustrates an example WPT reception method.

Turning to FIG. 7, an embodiment may include an apparatus for receiving wireless power. For example, a small device such as an RFID tag fitted with an appropriate receiver (coil or dipole) may be powered by received WPT. Likewise, more complex electronic devices including rechargeable batteries may be powered and/or recharged using received WPT, e.g., cellular phones, tablet computing devices, laptop computers, power tools, and other data processing or electrically powered devices or components generally (e.g., rechargeable batteries for vehicles).

In an embodiment a receiver (coil or dipole) is tuned to receive wireless power transmitted at a resonance frequency for a three dimensional structure at 701. The tuning may take a variety of forms from simple tuning and detuning to and from a predetermined frequency in a range or may include more complex tuning, including time domain or frequency domain multiplexing techniques to tune in and out.

Once the receiver is tuned at 701, the receiver (and any coupled apparatus or component) receives WPT at the resonance frequency at 702. As time progresses, an embodiment may cause the apparatus to communicate with the transmission system. For example, if the apparatus determines that a coupled rechargeable battery is charged to a predetermined amount, as illustrated at 703, the apparatus may detune the receiver at 704 such that the apparatus does not continue to draw power from the WPT resonance.

The receiver may be fixed frequency or tunable to more than one resonance frequency for the three dimensional structure and may tune into a given frequency at various times, e.g., according to predetermined instructions. The wireless communication (e.g., using a mechanism such as BLUETOOTH LE or the like) may communicate a variety of information between the receiving apparatus and the transmission system. For example, the receiving apparatus may communicate with a transmission system providing the wireless power to the three dimensional structure to inform the transmission system of a charging state, a preferred frequency range, a number of devices in the three dimensional structure, a reception status, etc. As will be understood, the transmission system may likewise communicate such information to the receiving device(s).

Various aspects may be embodied as a system, method or device. Accordingly, aspects may take the form of an entirely hardware embodiment or an embodiment including software that may all generally be referred to herein as a "circuit," or "system."

While specific blocks are used in the figures, and a particular ordering of blocks and elements has been illustrated, these are non-limiting examples. In certain contexts, two or more blocks or elements may be combined, a block or element may be split into two or more blocks or elements, or certain blocks or elements may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise. In the context of this document, a non-signal storage device is not a signal, is non-transitory, and "non-transitory" includes all media except signal media.

This disclosure has been presented for purposes of illustration and description but is not intended to be exhaustive or limiting. The example embodiments were chosen and described in order to explain principles and practical application, and to enable others to understand the disclosure for various embodiments with various modifications as are suited to the particular use contemplated.

Thus, although illustrative example embodiments have been described herein with reference to the accompanying figures, this description is not limiting and that various other changes and modifications may be affected therein without departing from the scope or spirit of the disclosure.

What is claimed is:

1. A method of wireless power transmission, the method comprising:
    powering a first transmitter that produces electromagnetic waves in a three dimensional structure, wherein the three dimensional structure comprises a cavity space allowing for placement of objects having power receivers within the cavity space;
    selecting a transmission frequency that is a first resonance frequency of the cavity space within the three dimensional structure; and
    stimulating the first transmitter at the first resonance frequency of the cavity space within the three dimensional structure to generate electromagnetic waves within the three dimensional structure, wherein the electromagnetic waves transmit power to a receiver located within the three dimensional structure.

2. The method of claim 1, further comprising selecting a second resonance frequency of the cavity space within the three dimensional structure.

3. The method of claim 2, wherein transmissions are made at the first resonance frequency and the second resonance frequency.

4. The method of claim 1, wherein the three dimensional structure is substantially enclosed.

5. The method of claim 1, wherein the three dimensional structure is a metallic structure.

6. The method of claim 5, wherein the metallic structure is a substantially complete enclosure.

7. The method of claim 1, further comprising:
    powering a second transmitter; and
    generating electromagnetic waves within the three dimensional structure using
        the second transmitter,
    wherein the first transmitter and the second transmitter are placed at different locations within the three dimensional structure.

8. The method of claim 7, wherein the first transmitter and the second transmitter transmit on different resonance frequencies of the cavity space within the three dimensional structure.

9. The method of claim 1, wherein the transmission frequency selected is less than 200 MHz.

10. An apparatus for wireless power transmission, the apparatus comprising:
    a power source; and
    a first transmitter operatively coupled to the power source, the first transmitter being placed in a three dimensional structure comprising a cavity space allowing for placement of objects having power receivers within the cavity space, and first the transmitter being stimulated to produce electromagnetic waves within the three dimensional structure,
    wherein the produced electromagnetic waves transmit power to a receiver located within the three dimensional structure, and
    wherein the first transmitter transmits is stimulated at a first transmission frequency that is a resonance frequency of the cavity space within the three dimensional structure.

11. The apparatus of claim 10, wherein power is further transmitted at a second transmission frequency that is a resonance frequency of the cavity space within the three dimensional structure.

12. The apparatus of claim 11, wherein the power is transmitted at the first transmission frequency and the second transmission frequency at different times.

13. The apparatus of claim 10, further comprising:
    a second transmitter, wherein the first transmitter and the second transmitter are placed at different locations within the three dimensional structure.

14. The apparatus of claim 13, wherein the first transmitter and the second transmitter transmit on different resonance frequencies of the cavity space within the three dimensional structure.

15. A system for wireless power transmission, the system comprising:
    a three dimensional structure;
    a first transmitter placed in the three dimensional structure, wherein the three dimensional structure comprises a cavity space allowing for placement of objects having power receivers within the cavity space; and
    a power source that powers the first transmitter to produce electromagnetic waves in the three dimensional structure,
    wherein the produced electromagnetic waves transmit power to a receiver located within the three dimensional structure, and
    wherein the first transmitter is stimulated at a first transmission frequency that is a resonance frequency of the cavity space within the three dimensional structure.

16. The system of claim 15, wherein power is further transmitted at a second transmission frequency that is a resonance frequency of the cavity space within the three dimensional structure.

17. The system of claim 16, wherein the power is transmitted at the first transmission frequency and the second transmission frequency at different times.

18. The system of claim 15, further comprising:
    a second transmitter,
    wherein the first transmitter and the second transmitter are placed at different locations within the three dimensional structure.

19. The system of claim 18, wherein the first transmitter and the second transmitter transmit on different resonance frequencies of the cavity space within the three dimensional structure.

20. An apparatus receiving wireless power, the apparatus comprising:
    a processor;
    a memory storing instructions that are executable by the processor; and
    a receiver that is coupled to the processor and coupled to an object, the receiver being tuned to receive wireless power transmitted at a resonance frequency of a cavity space within a three dimensional structure, wherein the three dimensional structure comprises the cavity space allowing for placement of the object having the coupled receiver within the cavity space.

21. The apparatus of claim 20, wherein the receiver is tunable to more than one resonance frequency of the cavity space within the three dimensional structure.

22. The apparatus of claim 20, wherein the processor executes instructions to tune the receiver to the resonance frequency.

23. The apparatus of claim 21, further comprising:
a rechargeable battery coupled to the receiver; and
a wirelesses communication mechanism;
wherein the apparatus communicates with a transmission system providing the wireless power to the three dimensional structure at the resonance frequency.

24. The apparatus of claim 23, wherein the apparatus communicates at least a charging state to the transmission system.

25. The apparatus of claim 20, wherein the receiver comprises a coil or a dipole.

* * * * *

UNITED STATES PATENT AND TRADEMARK OFFICE
CERTIFICATE OF CORRECTION

PATENT NO. : 10,707,685 B2
APPLICATION NO. : 14/698331
DATED : July 7, 2020
INVENTOR(S) : Sample et al.

Page 1 of 1

It is certified that error appears in the above-identified patent and that said Letters Patent is hereby corrected as shown below:

In the Claims

Column 9, Claim 3, Line 37, please insert --at different times-- after frequency;

Column 10, Claim 10, Line 4, please delete "transmits".

Signed and Sealed this
Twenty-second Day of September, 2020

Andrei Iancu
*Director of the United States Patent and Trademark Office*